United States Patent
Bas et al.

(10) Patent No.: US 8,896,368 B2
(45) Date of Patent: Nov. 25, 2014

(54) METHOD FOR MODULATING THE IMPEDANCE OF AN ANTENNA CIRCUIT

(71) Applicant: STMicroelectronics (Rousset) SAS, Rousset (FR)

(72) Inventors: Gilles Bas, Beauvoisin (FR); Christophe Moreaux, Simiane (FR); Gary Seigneuret, Saint Thibault des Vignes (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 14/090,843

(22) Filed: Nov. 26, 2013

(65) Prior Publication Data

US 2014/0077869 A1 Mar. 20, 2014

Related U.S. Application Data

(63) Continuation of application No. 13/292,940, filed on Nov. 9, 2011, now Pat. No. 8,659,347.

(30) Foreign Application Priority Data

Nov. 16, 2010 (FR) ..................................... 10 59423

(51) Int. Cl.
    *G05F 1/10* (2006.01)
(52) U.S. Cl.
    USPC .......................... 327/536; 340/10.1; 455/41.1
(58) Field of Classification Search
    USPC .......................... 327/536; 340/10.1; 455/41.1
    See application file for complete search history.

(56) References Cited

U.S. PATENT DOCUMENTS

| | | | |
|---|---|---|---|
| 5,838,254 A | * | 11/1998 | Kokubu et al. ............. 340/10.34 |
| 7,436,286 B2 | | 10/2008 | Fischer et al. |
| 7,561,866 B2 | | 7/2009 | Oliver et al. |
| 7,598,843 B2 | | 10/2009 | Pardoen |
| 7,703,677 B2 | * | 4/2010 | Alihodzic ..................... 235/451 |
| 7,839,210 B2 | | 11/2010 | Bas et al. |

(Continued)

FOREIGN PATENT DOCUMENTS

| | | |
|---|---|---|
| EP | 2031546 A2 | 3/2009 |
| FR | 2890501 A1 | 3/2007 |

OTHER PUBLICATIONS

République Française Institut National De La Propriété Industrielle, Rapport De Recherche Préliminaire (Preliminary Search Report); issued in French Patent Application No. 1059423 on Jul. 21, 2011 (7 pages).

*Primary Examiner* — Kenneth B. Wells
(74) *Attorney, Agent, or Firm* — Slater & Matsil, L.L.P.

(57) ABSTRACT

An electromagnetic transponder includes an antenna circuit, a load, and a charge pump transistor having a current path coupled between the antenna circuit and the load. During operation, a retromodulated signal is transmitted at a first level by biasing the charge pump transistor during a first time period such that an impedance of the antenna circuit has a first impedance value and current flows from the antenna circuit to the load. A retromodulated signal at a second level is transmitted by biasing the charge pump transistor during a second time period such that the impedance of the antenna circuit has a second impedance value different than the first impedance value and current flows from the antenna circuit to the load. The retromodulated signals are transmitted at the first and second levels in a sequence determined to transmit information from the electromagnetic transponder.

19 Claims, 3 Drawing Sheets

(56) References Cited

U.S. PATENT DOCUMENTS

| | | | |
|---|---|---|---|
| 7,876,225 B2 * | 1/2011 | Mickle et al. | 340/572.4 |
| 7,944,279 B1 | 5/2011 | El Waffaoui | |
| 8,022,889 B2 | 9/2011 | Rizzo et al. | |
| 8,127,998 B2 | 3/2012 | Kozuma et al. | |
| 8,319,611 B2 * | 11/2012 | Tsukamoto et al. | 340/10.34 |
| 8,330,578 B2 * | 12/2012 | Klapf et al. | 340/10.1 |
| 2003/0189483 A1 | 10/2003 | Saitoh et al. | |
| 2005/0280510 A1 | 12/2005 | Caruana et al. | |
| 2007/0127928 A1 | 6/2007 | Varshneya et al. | |
| 2008/0064346 A1 | 3/2008 | Charrat | |
| 2008/0150814 A1 | 6/2008 | Hedou et al. | |
| 2008/0212346 A1 | 9/2008 | Rizzo et al. | |
| 2008/0245851 A1 | 10/2008 | Kowalski | |
| 2009/0057418 A1 | 3/2009 | Kozuma et al. | |
| 2009/0096520 A1 | 4/2009 | Bas et al. | |
| 2009/0247079 A1 | 10/2009 | Charles et al. | |
| 2009/0273452 A1 | 11/2009 | Wuidart | |
| 2009/0291635 A1 | 11/2009 | Savry | |
| 2010/0297938 A1 | 11/2010 | Sabate et al. | |
| 2010/0321164 A1 | 12/2010 | Wuidart | |
| 2010/0323629 A1 | 12/2010 | Wuidart | |
| 2010/0328026 A1 | 12/2010 | Wuidart | |
| 2010/0328027 A1 | 12/2010 | Wuidart | |
| 2010/0328046 A1 | 12/2010 | Wuidart | |
| 2011/0095769 A1 | 4/2011 | Wuidart | |
| 2011/0140852 A1 | 6/2011 | Wuidart | |
| 2011/0148588 A1 | 6/2011 | Bacquet et al. | |

* cited by examiner

METHOD FOR MODULATING THE IMPEDANCE OF AN ANTENNA CIRCUIT

This application claims the benefit of U.S. application Ser. No. 13/292,940, now U.S. Pat. No. 8,659,347, filed on Nov. 9, 2011, which claims the priority benefit of French patent application number 10/59423, filed on Nov. 16, 2010, both of which are hereby incorporated herein.

TECHNICAL FIELD

The present invention relates to electromagnetic transponders, that is, transceivers capable of being interrogated contactless and wireless by a read and/or write terminal.

BACKGROUND

Many communication systems are based on a modulation of an electromagnetic field generated by a terminal. They range from a simple electronic tag used as a theft-prevention device to more complex systems where a transponder intended to communicate with the terminal, when present in the field thereof, is equipped with calculation or data processing functions (electronic purse, for example).

Electromagnetic transponder systems are based on the use of oscillating circuits comprising a winding forming an antenna, on the transponder side and on the terminal side. The antenna circuits of the transponder and of the terminal are intended to be coupled when the transponder enters the electromagnetic field of the terminal. These circuits are generally tuned to a same frequency corresponding to the excitation frequency of the oscillating circuit of the terminal.

So called remotely powered transponders, that is, transponders drawing from the high-frequency field radiated by the terminal an electric power capable of powering their electronic circuits, for example, a memory and/or a microcontroller, are here considered. A charge pump comprising a rectifying bridge and a storage capacitor is connected to the antenna circuit of the transponder. When the transponder is in the field radiated by the terminal, the electromagnetic signals provided by the antenna circuit supply the pump, and the capacitor charges. The capacitor plays the role of a power reservoir for providing a D.C. power supply voltage to the transponder circuits.

When the transponder must transmit data to the terminal, it modulates the load that it forms on the electromagnetic field radiated by the terminal. This process is generally called retromodulation. The retromodulation is carried out by means of an electronic switch, for example, a transistor, connected in parallel to the antenna circuit. When the switch is on, the charge pump is short-circuited and the transponder impedance drops. Thus, the most part of the power received by the transponder antenna is reflected towards the terminal. The impedance variation of the transponder translates as a current variation in the antenna circuit of the terminal. This variation is detected by an amplitude or phase demodulator of the terminal.

A disadvantage of this type of transponder is the fact that when the retromodulation switch is on, the charge pump stops being powered. Periods of data transmission by the transponder thus are critical in terms of generation of the transponder power supply.

It would be desirable to have a retromodulation system enabling the transponder to transmit data without interrupting the production of its electric power supply.

SUMMARY OF THE INVENTION

Thus, an embodiment of the present invention provides a retromodulation system overcoming at least some of the disadvantages of existing solutions.

Another embodiment provides such a system enabling not to interrupt the power supply generation in the transponder during retromodulation periods.

Another embodiment provides such a system enabling to maximize the amount of power generated during retromodulation periods.

Another embodiment provides such a system where the silicon surface area taken up by the transponder and/or the transponder selfcost are not significantly increased.

Thus, an embodiment provides an electromagnetic transponder comprising an antenna circuit capable of providing signals to a charge pump. The pump comprises a first transistor connected to a first capacitor. This transponder further comprises means for applying a voltage alternating between first and second values between the gate and the conduction terminal on the side of the first capacitor of the first transistor.

According to an embodiment, the first value is selected to maximize the conductivity of the first transistor and the second value is selected to limit the conductivity of the first transistor.

According to an embodiment, the second value is such that, when the transponder is in the presence of the electromagnetic field radiated by a corresponding terminal, the resistivity of the first transistor is increased, without interruption of the flowing of current through the first transistor.

According to an embodiment, the charge pump further comprises a second capacitor between a first antenna terminal and a common node, and a second rectifying transistor forward connected between a second antenna terminal and the node. The first transistor is a rectifying transistor forward connected between the node and a first electrode of the first capacitor. The second electrode of the first capacitor is connected to the second antenna terminal.

According to an embodiment, the first transistor is a P-channel MOS transistor and the second transistor is an N-channel MOS transistor. The sources of the first and second transistors are connected to the common node.

According to an embodiment, the second value is greater than the first value.

According to an embodiment, the voltage is applied using first and second current sources. A switch is used for alternately connecting the first and second sources between the gate and the drain of the first transistor.

Another embodiment provides a method for modulating, in an electromagnetic transponder, the impedance of an antenna circuit providing signals to a charge pump. The pump comprises a first transistor connected to a first capacitor. A voltage alternating between first and second values is applied between the gate and the conduction terminal on the side of the first capacitor of the first transistor.

According to an embodiment, the first value is selected to maximize the conductivity of the first transistor and the second value is selected to limit the conductivity of the first transistor.

According to an embodiment, the second value is smaller than the first value.

The foregoing and other objects, features, and advantages will be discussed in detail in the following non-limiting description of specific embodiments in connection with the accompanying drawings.

DETAILED DESCRIPTION OF ILLUSTRATIVE EMBODIMENTS

Figure 1:
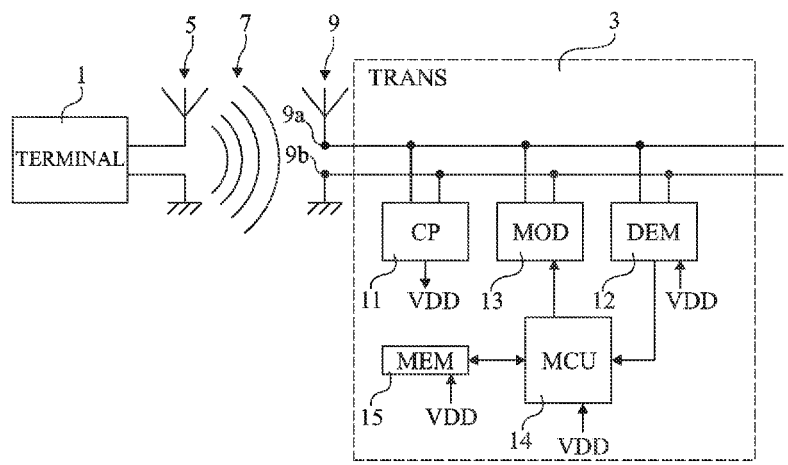
FIG. 1 is a simplified block diagram of a terminal and of a transponder of an electromagnetic transponder communication system.

For clarity, the same elements have been designated with the same reference numerals in the different drawings. Further, only those elements which are useful to the understanding of the present invention have been shown and will be described. In particular, the functions that may be implemented by a transponder, apart from retromodulation and electric power supply generation, have not been detailed, the present invention being compatible with any usual function of an electromagnetic transponder communication system.

FIG. 1 is a block diagram of an electromagnetic transponder communication system, comprising a terminal 1 (TERMINAL) and a transponder 3 (TRANS) capable of communicating with terminal 1. Terminal 1 may take different forms, for example, that of a transport ticket validation terminal, of a laptop computer, of an electronic control unit for starting an automobile vehicle, and others. Transponder 3 may similarly take different forms, for example, that of a chip card, of an electronic transport ticket, of an electronic passport, of a telecommunication terminal (GSM, PDA, etc.), of an electronic tag, and others.

Terminal 1 is provided with an antenna 5 coupled to an oscillating circuit (not shown) capable of generating an electromagnetic field 7, for example, a high-frequency field, that is, with a frequency approximately ranging between 100 MHz and 100 GHz. Terminal 1 may comprise various elements which do not appear in FIG. 1, for example, a modulator, a demodulator, a frequency regulation loop, a data processing microprocessor communicating with different input/output circuits (keyboard, display), etc. The elements of terminal 1 draw the power necessary to their operation from a supply circuit (not shown) connected, for example, to a power line distribution system or to a battery.

Transponder 3, capable of cooperating with terminal 1, is provided with an antenna circuit 9, tuned to the oscillating circuit of terminal 1, and capable of detecting the electromagnetic field emitted by the terminal. Antenna circuit 9 is, for example, an oscillating circuit tuned to the same resonance frequency as the oscillating circuit of terminal 1. In this example, apart from antenna circuit 9, transponder 3 comprises a charge pump 11 (CP), a demodulation circuit 12 (DEM), and a modulation or retromodulation circuit 13 (MOD), allowing contactless communications with terminal 1. Transponder 3 also comprises a control unit 14 (MCU), for example, a microcontroller. Transponder 3 also comprises one or several non-volatile memories or volatile memories 15 (MEM), which are able to store and/or to process data, for example, identification data.

Antenna circuit 9 forms a dipole comprising two conductive terminals, respectively 9a and 9b. In the presence of the magnetic field emitted by the terminal, terminals 9a and 9b provide A.C. signals in phase opposition. These signals, generally of small amplitude, for example, from a few tens to a few hundreds of millivolts, supply charge pump 11, thus resulting in the charging of a reservoir capacitor (not shown in the drawing). The charge pump provides a D.C. voltage $V_{DD}$, for example, on the order of a few volts, providing the electric power supply of the transponder circuits and especially of demodulator 12, of microcontroller 14, and of memory 15.

Demodulator 12 extracts the data that may have been transmitted by terminal 1 from the signals provided by antenna circuit 9. Microcontroller 14 accesses these data and/or memory 15, and provides modulation circuit 13 with data to be transmitted in return towards terminal 1.

Modulation circuit 13 comprises a switch (not shown in the drawing), arranged between terminals 9a and 9b of antenna circuit 9, and controlled by microcontroller 14. When the switch is off, transponder 3, and more specifically charge pump 11, absorbs most of the incident power emitted by terminal 1 and captured by antenna circuit 9. Conversely, when the switch is on, charge pump 11 is short-circuited and the transponder impedance strongly drops. As a result, part of the incident power emitted by terminal 1 is reflected by the transponder. The impedance variation of the transponder, and thus its reflection factor variation, translates as a current variation in the antenna circuit of the terminal. This variation is detectable by a demodulator of the terminal.

Figure 2:
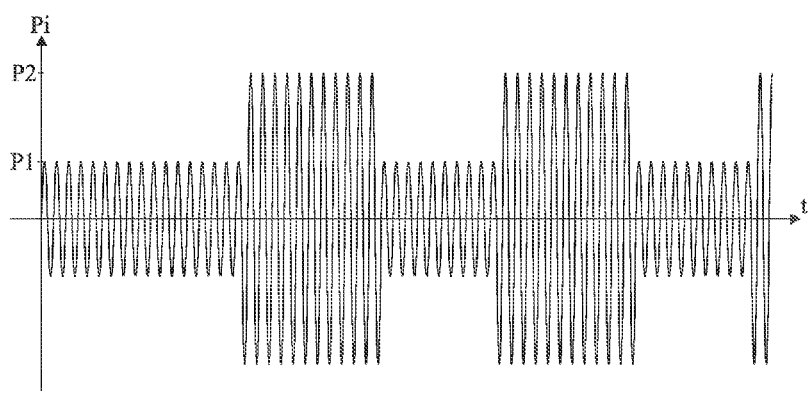
FIG. 2 is a timing diagram schematically showing an example of the variation of the electromagnetic signal seen by the terminal of FIG. 1 in the presence of the associated transponder.

FIG. 2 is a timing diagram schematically showing the variation of incident power Pi of the electromagnetic signal seen by the terminal of FIG. 1 in the presence of transponder 3. When the retromodulation switch of transponder 3 is off, part of the power emitted by terminal 1 is absorbed by transponder 3, and especially by charge pump 11. Incident power Pi seen by terminal 1 then is at a first level P1. When the retromodulation switch of transponder 3 is on, much of the power captured by the oscillating circuit of transponder 3 is reflected towards the terminal. Incident power Pi seen by terminal 1 then is at a second level P2 higher than level P1.

Figure 3:
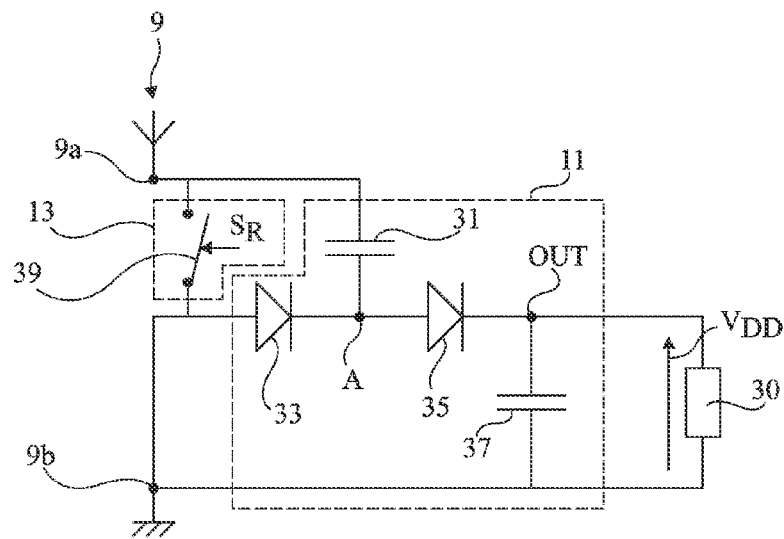
FIG. 3 is a simplified electric diagram of an example of an electromagnetic transponder.

FIG. 3 is a simplified electric diagram of an example of an electromagnetic transponder of the type described in relation with FIG. 1. The diagram of FIG. 3 especially shows in more detailed fashion charge pump 11 and retromodulation block 13. In this drawing, the transponder circuits intended to be electrically supplied by charge pump 11, for example, a demodulator, a microcontroller, and a memory, are symbolized by an equivalent impedance 30.

Charge pump 11 comprises a capacitor 31 between first terminal 9a of antenna circuit 9 and a common node A. Two diodes 33 and 35 are forward connected, respectively between terminal 9b of antenna circuit 9 and node A, and between node A and an output node OUT of the stage. A capacitor 37 forming a reservoir capacitor is provided between node OUT and terminal 9b. When the transponder is in the presence of the electromagnetic field radiated by the terminal, the antenna signals provided by terminals 9a and 9b are rectified and capacitor 37 charges. A D.C. voltage $V_{DD}$ settles across capacitor 37, enabling to power the transponder circuits.

Although this has not been shown in the drawings, charge pump 11 may comprise several successive stages. In particular, in addition to the current stage shown in FIG. 3, one may also provide a next stage comprising: a first capacitor between terminal 9a and a common node; a first forward-connected diode between output node OUT of the current stage and the common node of the next stage; a second forward-connected diode between the common node of the next stage and an output node of the next stage; and a second capacitor between the output node of the next stage and terminal 9b. Several similarly interconnected successive stages may be provided. In this case, when the transponder is in the presence of the electromagnetic field radiated by the terminal, power supply voltage $V_{DD}$ settles across the reservoir capacitor of the last stage, that is, between the output node of the last stage and terminal 9b.

Retromodulation block 13 is essentially formed by an electronic switch 39, for example, a MOS transistor, connected between terminals 9a and 9b of the antenna circuit and controlled by a signal $S_R$.

As mentioned hereinabove, a disadvantage of this type of transponder is that, during periods of data transmission by the transponder, when retromodulation switch 39 is on, charge pump 11 stops being supplied and capacitor 37 discharges. When voltage $V_{DD}$ falls below a given threshold, the transponder circuits can no longer operate. Data transmission periods must thus be short. Further, the more distant the transponder from the terminal, the lower the antenna signals provided by terminals 9a and 9b, and the slower the charge of capacitor 37. Thus, the periods of data transmission by the transponder are all the more critical as the transponder is distant from the terminal.

Figure 4:
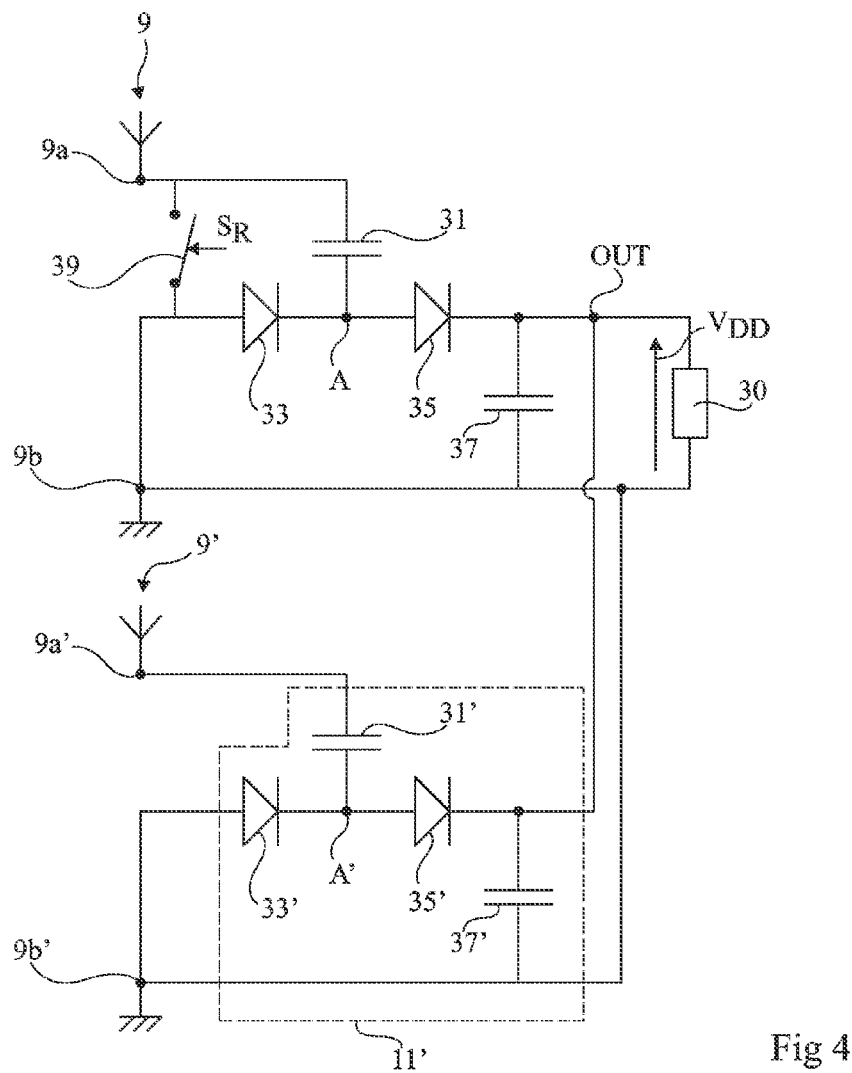
FIG. 4 is a simplified electric diagram of another example of an electromagnetic transponder.

FIG. 4 is a simplified electric diagram showing another example of an electromagnetic transponder. The transponder of FIG. 4 comprises the same elements as the transponder of FIG. 3, and further comprises a second antenna circuit 9' similar to circuit 9. Circuit 9' is for example tuned to the same frequency as circuit 9. In the presence of the magnetic field radiated by the terminal, it provides antenna signals on terminals 9a' and 9b'. These signals supply a charge pump 11', which is similar to pump 11 associated with circuit 9. Pump 11' comprises a capacitor 31' and diodes 33' and 35' forming a rectifying bridge and a capacitor 37' forming a reservoir capacitor. Capacitor 37' is connected in parallel with capacitor 37 and takes part in the generation of power supply voltage $V_{DD}$.

Unlike antenna circuit 9, antenna circuit 9' is not associated with a retromodulation switch. Thus, during periods of data transmission by the transponder, only charge pump 11 associated with antenna circuit 9 is short-circuited. Pump 11' continues to generate electric power. This feature enables the maintenance of voltage $V_{DD}$ at a sufficient level to power the transponder circuits. Such a transponder can transmit longer and/or at a greater distance from the terminal than transponders of the type described in relation with FIG. 1.

However, the provision of two antenna circuits and of two charge pumps significantly increases the bulk and the cost of the transponder.

Figure 5:
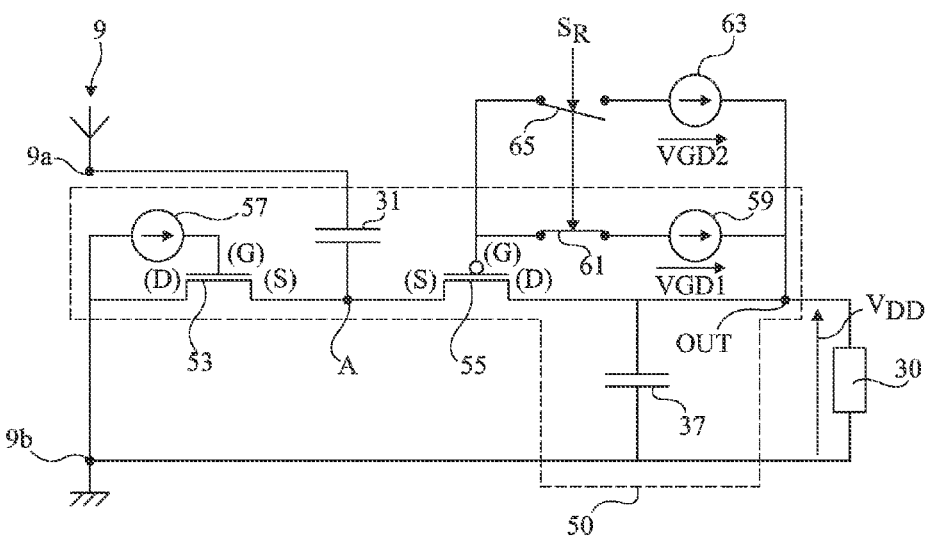
FIG. 5 is a simplified electric diagram of an embodiment of an electromagnetic transponder.

FIG. 5 is a simplified electric diagram of an embodiment of an electromagnetic transponder capable of continuing to generate an electric power supply when it transmits data.

The diagram of FIG. 5 shows elements of the diagram of FIG. 3. In particular, the transponder of FIG. 5 comprises an antenna circuit 9, forming a dipole capable of providing antenna signals on terminals 9a and 9b. A charge pump 50 is connected to terminals 9a and 9b of the antenna circuit. Pump 50 differs from pump 11 of FIG. 3 only in that rectifying diodes 33 and 35 of FIG. 3 are replaced with MOS transistors 53 and 55 having their conduction terminal on the side of capacitor 37 (e.g., drain (D)) connected to their gate (G). In the shown example, transistor 53 is an N-channel MOS transistor and transistor 55 is a P-channel MOS transistor. Transistors 53 and 55 behave as rectifiers, that is, transistor 53 is only conductive for positive currents in the direction from terminal 9b to node A, and transistor 55 is only conductive for positive currents in the direction from node A to node OUT. The source of transistor 53 is connected to node A and the drain of transistor 53 is connected to antenna terminal 9b. The source of transistor 55 is connected to node A and the drain of transistor 55 is connected to node OUT.

The described embodiments are however not limited to this specific configuration. More generally, transistors 53 and 55 will be selected so that in normal operation, transistor 53 is only conductive for positive currents between terminal 9b and node A, and transistor 55 is only conductive for positive currents between node A and node OUT.

Capacitors 31 and 37 are respectively arranged between antenna terminal 9a and node A and between antenna terminal 9b and node OUT. In FIG. 5, the electronic circuits capable of being electrically powered by charge pump 50, for example, a demodulator, a microcontroller, and a memory, are once again symbolized by an equivalent impedance 30 connected across capacitor 37.

A voltage source 59, or bias source, in series with a switch 61, is provided to apply a first voltage VGD1 between the gate and the drain of transistor 55 when the transponder is in the field of the terminal 1. The value of voltage VGD1 is selected to maximize the conductivity of rectifying transistor 55, that is, to cancel or to minimize its threshold voltage.

Another voltage source 63, or bias source, in series with a switch 65, is provided in parallel with source 59 and switch 61, to apply a second voltage VGD2 between the gate and the drain of transistor 55. The value of voltage VGD2 is selected to limit the flowing of current through transistor 55, that is, to increase the drain-source resistance of transistor 55 without however interrupting the current flow in this transistor. In practice, in this example, voltage VGD2 is smaller than voltage VGD1. A voltage VGD2 greater than voltage VGD1 may also be applied to favor the inverse drain-source current of the transistor and thus limit the current flow from node A to node OUT. In both cases, the charge pump efficiency is impacted, thus enabling a retromodulation.

The association of switches 61 and 65 enables to choose to connect one or the other of voltage sources 59 and 63 between the gate and the drain of transistor 55. In this example, switches 61 and 65 are controlled by the same signal $S_R$, so that they can be neither both off nor both on.

In the shown example, a voltage source 57 is also provided between the gate and the drain of transistor 53, to cancel or minimize the threshold voltage of this transistor.

Unlike the transponder of FIG. 3, the transponder of FIG. 5 comprises no retromodulation switch between antenna terminals 9a and 9b. A retromodulation mode can be implemented by varying the transponder impedance by having the gate-drain voltage of transistor 55 vary between values VGD1 and VGD2.

When switches 61 and 65 are respectively on and off, voltage VGD1 is applied between the gate and the drain of transistor 55. Thus, transistors 53 and 55 behave substantially as low threshold voltage diodes, forward connected, respectively, between terminal 9b and node A and between node A and node OUT. The antenna signals provided by terminals 9a and 9b are rectified and capacitor 37 charges. A D.C. voltage $V_{DD}$ settles across capacitor 37, thus ensuring the electric power supply of the transponder circuits.

When switches 61 and 65 are respectively off and on, voltage VGD2 is applied between the gate and the drain of transistor 55. Transistor 55 becomes more resistive, causing an increase in the impedance across antenna circuit 9 of the transponder. Thus, the load formed by the transponder on the field radiated by the terminal increases. The impedance variation of the transponder translates as a current variation in the antenna circuit of the terminal. This variation is detectable by an amplitude or phase demodulator of the terminal. However, voltage VGD2 is selected to be such that the current flow between node A and node OUT is not interrupted. Thus, transistors 53 and 55 still behave as rectifiers and capacitor 37 keeps on charging.

The provided transponder can thus transmit data without interrupting the generation of its electric power supply.

Another advantage of the provided retromodulation mode is that its implementation implies no significant increase in the transponder bulk and cost.

Although this is not shown in FIG. 5, charge pump 50 may comprise several successive pumping stages, interconnected as described in relation with FIG. 3. In this case, it may be chosen to apply the retromodulation on one or several of the pumping stages. It may also be chosen to apply the retromodulation to transistor 53 rather than to transistor 55, or to both at the same time.

Figure 6:
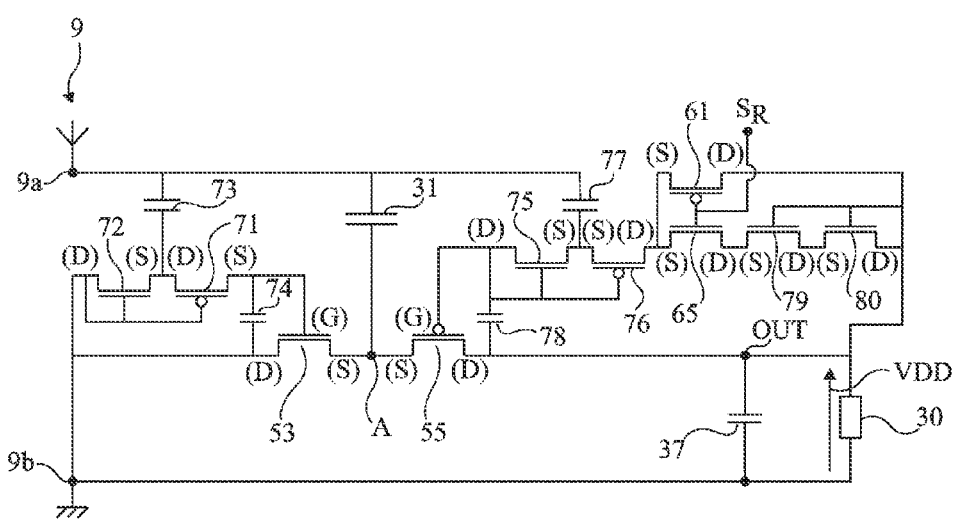
FIG. 6 is a more detailed electric diagram of an alternative embodiment of the electric transponder of FIG. 5.

FIG. 6 is a more detailed electric diagram of the electromagnetic transponder of FIG. 5, illustrating an embodiment of voltage sources 57, 59, and 63.

Source 57 comprises a P-channel MOS transistor 71 in series with an N-channel MOS transistor 72, between the gate and the drain of transistor 53. The source of transistor 71 is connected to the gate of transistor 53, and the drains of transistors 72 and 53 are interconnected. The source and the drain of transistors 71 and 72 are common. The gates of transistors 71 and 72 are connected to the drain of transistor 53. A capacitor 73 is connected between antenna terminal 9a and the common node between transistors 71 and 72, and a capacitor 74 is connected between the gate and the drain of transistor 53.

Voltage source 59 comprises an N-channel transistor 75 in series with a P-channel MOS transistor 76. The drain of transistor 75 is connected to the gate of transistor 55 and the sources of transistors 75 and 76 are common. The gates of transistors 55, 75, and 76 are interconnected. A capacitor 77 is connected between antenna terminal 9a and the common node of transistors 75 and 76, and a capacitor 78 is connected between the gate and the drain of transistor 55.

Switch 61 comprises a P-channel MOS transistor having its source connected to the drain of transistor 76 and having its drain connected to node OUT. The gate of transistor 61 is connected to a control terminal capable of receiving retromodulation signal $S_R$.

Voltage source 63 comprises the same transistors and capacitors as voltage source 59, and further comprises two N-channel MOS transistors in series, respectively 79 and 80. The drain of transistor 79 and the source of transistor 80 are common, and the drain of transistor 80 is connected to node OUT. The gates of transistors 79 and 80 are also connected to node OUT.

Switch 65 comprises an N-channel MOS transistor having its drain connected to the source of transistor 79 and having its source connected to the drain of transistor 76. The gate of transistor 65 is connected to the same control terminal as the gate of transistor 61, capable of receiving retromodulation signal $S_R$.

According to an embodiment of the circuit of FIG. 6, the shown transistors and capacitors have the following features:

transistors 71, 72, 75, and 76 have a gate width W=0.3 μm and a gate length L=0.18 μm;

transistors 53, 55, 61, and 65 have a gate width W=15 μm and a gate length L=0.18 μm;

transistors 79 and 80 have a gate width W=1.5 μm and a gate length L=1.5 μm;

capacitors 31, 37 have a 1-pF capacitance; and capacitors 73, 74, 77, and 78 have a 200-fF capacitance.

Although this is not shown in the drawing, the transponder of FIG. 6 may comprise several successive pumping stages, for example, three stages identical to the stage shown and described.

It should be noted that in FIGS. 5 and 6, the positions of the sources and drains of the transistors have been given as an indication only. In operation, due to the potential differences settling in the circuit, the positions of the sources and drains of some transistors have been inverted. As an example, in operation, node A receives an A.C. voltage. If the gate voltage of transistor 55 is fixed, node A can thus alternately be the source or the drain of transistor 55. However, transistors 53 and 55 are assembled as rectifiers and only allow a current flow from terminal 9b to node A and from node A to node OUT, to avoid any discharge of capacitor 37. Generally, it is here provided to apply bias voltages enabling to maximize the forward positive current from terminal 9b to node A and to node OUT in the absence of a retromodulation and, during retromodulation periods, to limit this current, for example, by increasing the internal resistance of the transistor, or by favoring the inverse current in one and/or the other of the transistors.

Specific embodiments of the provided transponder have been described. Various alterations and modifications will occur to those skilled in the art. In particular, the described embodiments are not limited to charge pumps of the type described in relation with FIGS. 5 and 6. Further, in the case of a charge pump of the type described in relation with FIGS. 5 and 6, the described embodiments are not limited to the selection of transistor 55 to apply the retromodulation. More generally, any type of charge pump comprising at least one rectifying transistor may be used, the retromodulation being applied by varying the gate-drain voltage of one or several transistors of the charge pump.

Further, an embodiment where the gate-drain voltage of a rectifying transistor is alternated between two values has been described hereabove. It may also be chosen to have this voltage vary between more than two values. The applied voltage may for example be adapted according to the charge level of the reservoir capacitor of the charge pump. It may especially be provided to increase the conductivity of the rectifying transistor if voltage level $V_{DD}$ falls below a critical threshold, for example, due to the distance between the transponder and the terminal. A variable voltage source 63 controlled by a detector measuring the voltage across reservoir capacitor 37 may especially be provided to optimize the compromise between the transponder visibility and the generation of its electric power supply voltage.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of operating an electromagnetic transponder that includes an antenna circuit, a load, and a charge pump transistor having a current path coupled between the antenna circuit and the load, the method comprising:

transmitting a retromodulated signal at a first level by biasing the charge pump transistor during a first time period such that an impedance of the antenna circuit has a first impedance value and current flows from the antenna circuit through the charge pump transistor to the load; and transmitting the retromodulated signal at a second level by biasing the charge pump transistor during a second time period such that the impedance of the antenna circuit has a second impedance value different than the first impedance value and current flows from the antenna circuit through the charge pump transistor to the load, wherein the retromodulated signals are transmitted at the first and second levels in a sequence determined to transmit information from the electromagnetic transponder.

2. The method of claim 1, wherein biasing the charge pump transistor during the first time period comprises coupling a first current source to a gate of the charge pump transistor and wherein biasing the charge pump transistor during the second time period comprises coupling a second current source to the gate of the charge pump transistor.

3. The method of claim 2, wherein the first current source is selected to increase the conductivity of the charge pump transistor and the second current source is selected to reduce the conductivity of the charge pump transistor.

4. The method of claim 1, wherein a magnitude of the current flowing from the antenna circuit to the load is greater during the first time period than during the second time period.

5. The method of claim 1, wherein a reservoir capacitor is coupled in parallel with the load and the current flowing from the antenna circuit to the load is operable to supply the load and the reservoir capacitor with an uninterrupted current.

6. An electromagnetic transponder comprising:
an antenna circuit configured to transmit and receive electromagnetic signals;
a charge pump, wherein the antenna circuit is configured to provide signals to the charge pump, the charge pump comprising a first transistor with a first conduction path coupled between the antenna and a first capacitor; and
a control circuit configured to cause the transponder to:
transmit a first signal by performing a first retromodulation on a load formed in an electromagnetic field produced by a transmitting terminal, wherein performing the first retromodulation comprises applying a first voltage value to a gate of the first transistor, and
transmit a second signal by performing a second retromodulation on the load formed in the electromagnetic field produced by the transmitting terminal, wherein performing the second retromodulation comprises applying a second voltage value to the gate of the first transistor, wherein the first transistor conducts a current when the first voltage value is applied to the gate and when the second voltage value is applied to the gate.

7. The transponder of claim 6, wherein the control circuit comprises a first current source configured to apply the first voltage value and a second current source configured to apply the second voltage value.

8. The transponder of claim 7, wherein the control circuit further comprises a first switch configured to couple the first current source to the gate of the first transistor and a second switch configured to couple the second current source to the gate of the first transistor, wherein the first and second switches are configured to receive a switching control signal.

9. The transponder of claim 6, wherein the first voltage value is selected to increase the conductivity of the first transistor and the second voltage value is selected to decrease the conductivity of the first transistor.

10. The transponder of claim 9, wherein the second voltage value is such that, when the transponder is in an electromagnetic field radiated by a corresponding terminal, an impedance seen at the terminal is increased.

11. The transponder of claim 6, wherein the charge pump further comprises a second capacitor coupled between the antenna circuit and the first transistor and a second rectifying transistor forward-connected from a ground node to a node between the first transistor and the second capacitor.

12. The transponder of claim 11, wherein the first transistor is a P-channel MOS transistor and the second rectifying transistor is an N-channel MOS transistor.

13. The transponder of claim 6, further comprising a circuit load in parallel with the first capacitor.

14. The transponder of claim 13, wherein the circuit load comprises a controller and a memory.

15. A method of receiving uninterrupted wireless power at an electromagnetic transponder that includes an antenna circuit, a load, and a charge pump transistor, the method comprising:
supplying a first power level from the antenna circuit through the charge pump transistor to the load during a first time period;
transmitting a first retromodulated signal during the first time period;
supplying a second power level from the antenna circuit through the charge pump transistor to the load during a second time period; and
transmitting a second retromodulated signal during the second time period, wherein the first and second power levels are operable to supply the load with uninterrupted power.

16. The method of claim 15, wherein supplying the first power level comprises setting an impedance of the charge pump transistor to a first value and wherein supplying the second power level comprises setting the impedance of the charge pump transistor to a second value.

17. The method of claim 16, wherein setting the impedance of the charge pump transistor to a first value comprises supplying a first drive signal to a gate of the charge pump transistor and wherein setting the impedance of the charge pump transistor to a second value comprises supplying a second drive signal to the gate of the charge pump transistor.

18. The method of claim 17, wherein supplying the first drive signal comprises coupling a first current source to the gate of the charge pump transistor and wherein supplying the second drive signal comprises coupling a second current source to the gate of the charge pump transistor.

19. The method of claim 15, wherein transmitting a first retromodulated signal comprises setting an impedance of the charge pump transistor to a first value and wherein transmitting a second retromodulated signal comprises setting the impedance of the charge pump transistor to a second value.

* * * * *